(12) United States Patent
Trapani et al.

(10) Patent No.: US 10,706,727 B1
(45) Date of Patent: Jul. 7, 2020

(54) ADAPTIVE FLIGHT DISPLAY RADIO TUNING SYSTEM

(71) Applicant: Rockwell Collins, Inc., Cedar Rapids, IA (US)

(72) Inventors: Joseph J. Trapani, Marion, IA (US); Evie R. Johnson, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 190 days.

(21) Appl. No.: 16/021,554

(22) Filed: Jun. 28, 2018

(51) Int. Cl.
*G08G 5/00* (2006.01)
*H04B 7/185* (2006.01)

(52) U.S. Cl.
CPC ......... *G08G 5/0021* (2013.01); *G08G 5/0013* (2013.01); *H04B 7/18506* (2013.01)

(58) Field of Classification Search
CPC . G08G 5/0021; G08G 5/0013; H04B 7/18506
See application file for complete search history.

(56) References Cited

U.S. PATENT DOCUMENTS

| | | | | |
|---|---|---|---|---|
| 4,845,495 A * | 7/1989 | Bollard | ................. | G01C 23/00 340/973 |
| 5,416,705 A * | 5/1995 | Barnett | ................. | G01C 23/00 340/10.42 |
| 6,282,417 B1 * | 8/2001 | Ward | ................. | G08G 5/0013 455/431 |
| 6,832,138 B1 * | 12/2004 | Straub | ................. | G01C 23/00 701/3 |
| 8,633,913 B1 * | 1/2014 | Raghu | ................. | G08G 5/0021 340/945 |
| 9,284,045 B1 * | 3/2016 | Springer | ................. | G08G 5/003 |
| 9,734,722 B1 * | 8/2017 | Markey | ................. | G01C 21/20 |
| 9,858,823 B1 * | 1/2018 | Lynn | ................. | G08G 5/0034 |
| 2002/0119758 A1 * | 8/2002 | Gouillou | ............. | G08G 5/0008 455/74 |
| 2011/0118908 A1 * | 5/2011 | Boorman | ............. | G08G 5/0021 701/14 |
| 2015/0239574 A1 * | 8/2015 | Ball | ................. | B64D 45/00 701/3 |
| 2015/0261379 A1 * | 9/2015 | Kneuper | ............. | G08G 5/0052 345/173 |

* cited by examiner

*Primary Examiner* — Tadesse Hailu
(74) *Attorney, Agent, or Firm* — Suiter Swantz pc llo

(57) ABSTRACT

An aircraft system may include a civil radio, a mission radio, and an adaptive flight display. The adaptive flight display may include a display, a processor, and memory. The memory may maintain a civil radio tuning system application and a mission radio tuning system application. The civil radio tuning system application and the mission radio tuning system application may be associated with the civil radio and the mission radio, respectively. The processor may be configured to: execute the civil radio tuning system application and the mission radio tuning system application; tune the civil and mission radios; generate a graphical user interface multifunction window including slots; assign slots to display information associated with the civil and mission radio tuning system applications; and output, to the display, the graphical user interface multifunction window having particular slots filled with the information associated with the civil and mission radio tuning system applications.

20 Claims, 5 Drawing Sheets

ADAPTIVE FLIGHT DISPLAY RADIO TUNING SYSTEM

BACKGROUND

Typically, adaptive flight displays in aircraft contain many iterations and styles to display civil radio information. However, there has yet to be a seamless customizable solution which allows swapping of radios and display formats. Additionally, modifying adaptive flight displays to be able to display information of other radio types is expensive.

Pilots are facing a number of issues in the flight deck today. Industry and research organizations have been observing that procedural complexity is pushing past the limits of human capacity and part time automation is creating a crisis in the cockpit and eroding skills. Additionally, the trend has been to add systems, sensors, and multiple display windows leaving pilots to integrate and monitor information, and airplane system integration is going up while pilot system knowledge is going down. Too much to do without enough time, tools or resources leads to the inability to focus, assess risk, and manage threats and errors. Distractions result in a loss of situational awareness and continue to be the most pervasive human threat to safety. Situation awareness (SA) is being aware of what is happening around you and understanding what that information means to you now and in the future. The pilot can be severely challenged in rapidly bringing all of the available information together in a form that is manageable for making accurate decisions in a timely manner.

Many features of currently implemented adaptive flight displays are not designed around situation awareness, and currently implemented adaptive flight displays do not permit the flight crew to effectively manage civil radio information and information of other radio types in a single display location.

SUMMARY

In one aspect, embodiments of the inventive concepts disclosed herein are directed to an aircraft system. The aircraft system may include a civil radio, a mission radio, and an adaptive flight display implemented in an aircraft. The adaptive flight display may include a display, a processor, and memory communicatively coupled to the processor. The adaptive flight display may be communicatively coupled to the civil radio and the mission radio. The memory may be configured to maintain a civil radio tuning system application and a mission radio tuning system application. The civil radio tuning system application may be associated with the civil radio. The mission radio tuning system application may be associated with the mission radio. The processor may be configured to: execute the civil radio tuning system application and the mission radio tuning system application; tune the civil radio and the mission radio; generate a graphical user interface multifunction window including a plurality of slots, each slot being assignable to display information associated with a civil radio tuning system application and a mission radio tuning system application; assign a first particular slot of the plurality of slots to display information associated with the civil radio tuning system application; assign a second particular slot of the plurality of slots to display information associated with the mission radio tuning system application; and output, to the display, the graphical user interface multifunction window having particular slots filled with the information associated with the civil radio tuning system application and the mission radio tuning system application. The display of the adaptive flight display may be configured to present, to a user, the graphical user interface multifunction window having the particular slots filled with the information associated with the civil radio tuning system application and the mission radio tuning system application.

In a further aspect, embodiments of the inventive concepts disclosed herein are directed to an aircraft system. The aircraft system may include a civil radio, a mission radio, a display, and an avionics computing device implemented in an aircraft. The avionics computing device may include a display, a processor, and memory communicatively coupled to the processor. The avionics computing device may be communicatively coupled to the civil radio, the mission radio, and the display. The memory may be configured to maintain a civil radio tuning system application and a mission radio tuning system application. The civil radio tuning system application may be associated with the civil radio. The mission radio tuning system application may be associated with the mission radio. The processor may be configured to: execute the civil radio tuning system application and the mission radio tuning system application; tune the civil radio and the mission radio; generate a graphical user interface multifunction window including a plurality of slots, each slot being assignable to display information associated with a civil radio tuning system application and a mission radio tuning system application; assign a first particular slot of the plurality of slots to display information associated with the civil radio tuning system application; assign a second particular slot of the plurality of slots to display information associated with the mission radio tuning system application; and output, to the display, the graphical user interface multifunction window having particular slots filled with the information associated with the civil radio tuning system application and the mission radio tuning system application. The display may be configured to present, to a user, the graphical user interface multifunction window having the particular slots filled with the information associated with the civil radio tuning system application and the mission radio tuning system application.

In a further aspect, embodiments of the inventive concepts disclosed herein are directed to a method of operating an aircraft system. The method may include executing, by a processor of an adaptive flight display implemented in an aircraft, a civil radio tuning system application and a mission radio tuning system application. The adaptive flight display may include a display, the processor, and memory communicatively coupled to the processor. The adaptive flight display may be communicatively coupled to a civil radio and a mission radio implemented in the aircraft. The memory may be configured to maintain the civil radio tuning system application and the mission radio tuning system application. The civil radio tuning system application may be associated with the civil radio. The mission radio tuning system application may be associated with the mission radio. The method may further include tuning, by the processor, the civil radio and the mission radio. The method may further include generating, by the processor, a graphical user interface multifunction window including a plurality of slots, each slot being assignable to display information associated with one of the civil radio tuning system application and the mission radio tuning system application. The method may further include assigning, by the processor, a first particular slot of the plurality of slots to display information associated with the civil radio tuning system application. The method may further include assigning, by the processor, a second particular slot of the plurality of slots to display information associated with the mission radio tuning system application. The method may further include outputting, by the processor, to the display, the graphical user interface multifunction window having particular slots filled with the information associated with the civil radio tuning system application and the mission radio tuning system application. The method may further include presenting, by the display of the adaptive flight display, to a user, the graphical user interface multifunction window having the particular slots filled with the information associated with the civil radio tuning system application and the mission radio tuning system application.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
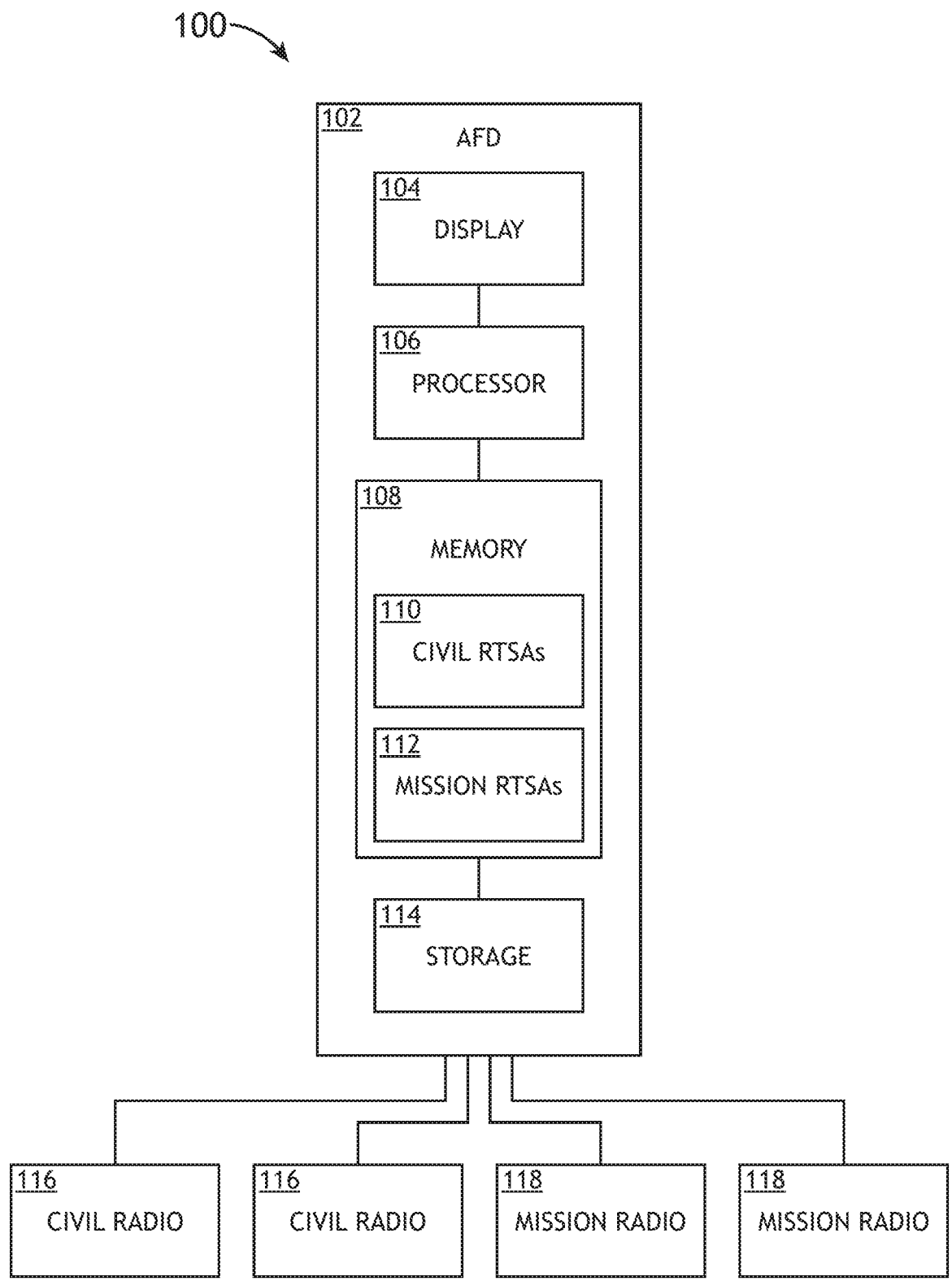
FIG. 1 is a view of an exemplary embodiment of a system implemented in an aircraft according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and a method for managing and displaying civil and mission radio information in a graphical user interface multifunction window on a display implemented in a cockpit of an aircraft. Embodiments may improve the field of aviation by improving safety and improving a pilot's situational awareness by displaying civil and mission radio information at single display location such that a pilot can easily monitor all information of civil and mission radios at single display location; such embodiments, may improve the field of aviation by improving the operational safety of an aircraft.

Some embodiments allow developers to easily and inexpensively customize a radio tuning system to by loading uncertified third-party applications (e.g., mission radio tuning system applications) on an adaptive flight display so that mission radio information can be displayed alongside civil radio information at single display location.

In some embodiments, the radio tuning software maintained on an adaptive flight display allows for an external file to be loaded with custom input and output bit redefinitions. This allows the civilian software component (e.g., a civil radio tuning system application) to manage different models and manufactures of radios and to provide a graphical user interface multifunction window depicting information of various radios (e.g., civil and mission radios) displayed at a single display location. A predefined list of modifiable features allows the end user to adjust where the input is coming from and where the output is going to so the radio tuning control is able to send and receive commands and status from radios which are not typically included in the native adaptive flight display flight deck hardware provided by the original equipment manufacturer. For example, the adaptive flight display may receive a user input or data command to add a radio to the graphical user interface multifunction window, to remove or hide a radio from the graphical user interface multifunction window, or to rearrange a layout (e.g., by moving radio information from one slot to another) of the graphical user interface multifunction window.

For example, the external file may be implemented as a loadable XML data structure (e.g., a table) that may define specific radio types (e.g., COM, HF, VOR/ILS, DME, ADF, transponder, and/or TCAS) for an implemented civil radio tuning system application. Each radio type may have a predefined set of fields having information about the radio, which allows a processor executing the civil radio tuning system application to direct what radio information to display and where to appropriately display the radio information in the graphical user interface multifunction window. For third-party or mission radios, the external file may be used to by a processor executing the civil radio tuning system application to remap existing user interface controls to new input/outputs, as defined by the external file, which allows a processor executing the radio tuning system application to direct what third party or mission radio information to display and where to appropriately display the third-party or mission radio information in the graphical user interface multifunction window.

Referring now to FIG. 1, an exemplary embodiment of a system (e.g., an aircraft system) implemented in an aircraft 100 according to the inventive concepts disclosed herein includes at least one display (e.g., an adaptive flight display 102 of three forward displays of a cockpit), at least one civil radio 116, and at least one mission radio 118, some or all of which may be communicatively coupled at any given time.

The civil radios 116 may be configured to communicate with offboard radios. Civil radios may be defined as any radio device that is used in civilian aviation to transmit and receive information during any phase of flight. The civil radios 116 may be configured for civilian communication and navigation. For example, the civil radios 116 may be implemented as or include very high frequency (VHF) radios (communication), high frequency (HF) radios (communication), automatic direction finder (ADF) radios (navigation), very high frequency (VHF) omni-directional range (VOR) radios (navigation), instrument landing system (ILS) radios (navigation), glidescope and marker beacon radios (navigation), distance measuring equipment (DME) radios (navigation), transponders radios (navigation).

The mission radios 118 may be configured to communicate with offboard radios. Mission radios may be defined as any radio device that is controlled by a mission radio tuning application which controls the radio hardware. For example, the mission radios 118 may be configured for military communications and navigation. For example, the mission radios 118 may be implemented as or include a very high frequency (VHF) radios (communication), ultra high frequency (UHF) radios (communication), high frequency (HF) radios (communication), tactical air navigation system (TACAN) radios (navigation), global positioning system (GPS) based radios (navigation), automatic direction finder (ADF) radios (navigation), very high frequency (VHF) omni-directional range (VOR) radios (navigation), instrument landing system (ILS) radios (navigation), glidescope and marker beacon radios (navigation), distance measuring equipment (DME) radios (navigation), transponders radios (navigation), and identification friend or foe (IFF) radios (navigation).

The adaptive flight display (AFD) 102 may include a display 104, at least one processor 106, memory 108, and storage 114, as well as other components, equipment, and/or devices commonly included in an adaptive flight display, some or all of which may be communicatively coupled to one another.

The adaptive flight display 102 (and/or components thereof) may be configured to perform any of various functions typically performed by an adaptive flight display, as would be appreciated by those of skill in the art. Additionally, the adaptive flight display 102 (and/or components thereof) may be configured to perform any of various functions as disclosed throughout. For example, the adaptive flight display 102 may be configured to receive graphics data (e.g., graphics commands) and render graphics associated with such graphics data for display to a user (e.g., a pilot). Additionally, the adaptive flight display may be configured to communicate with and tune the civil radios 116 and the mission radios 118.

The processor 106 may be configured to run various software applications (e.g., at least one civil radio tuning system application (RTSA) 110 and at least one mission radio tuning system application 112) or computer code stored (e.g., maintained) in a non-transitory computer-readable medium (e.g., memory 108 or storage 110) and configured to execute various instructions or operations. Additionally, for example, the processor 106 may be implemented as a special purpose computer or a special purpose processor configured (e.g., programmed) to execute instructions for performing any or all of the operations disclosed throughout.

For example, the processor 106 may be configured to execute the at least one civil radio tuning system application 110 and the at least one mission radio tuning system application 112. Each of the at least one civil radio tuning system application 110 may be associated with a particular civil radio of the at least one civil radio 116. Each of the at least one mission radio tuning system application 112 may be associated with a particular mission radio of the at least one mission radio 118. By executing the at least one civil radio tuning system application 110 and the at least one mission radio tuning system application 112, the processor 106 may be configured to may be configured to perform any of various operations disclosed throughout. For example, the processor 106 may be configured to generate a graphical user interface multifunction window comprising a plurality of slots. Each slot may be assignable to display information associated with one of at least one civil radio tuning system application and at least one mission radio tuning system application. For example, the processor 106 may be configured to assign each of at least one first particular slot of the plurality of slots to display information associated with the at least one civil radio tuning system application. For example, the processor 106 may be configured to assign each of at least one second particular slot of the plurality of slots to display information associated with the at least one mission radio tuning system application. For example, the processor 106 may assign slots based on information about civil radios 116 and mission radios 118 stored in a data structure. Additionally, the processor 106 may be configured to output, to the display 104, the graphical user interface multifunction window having particular slots filled with the information associated with the at least one civil radio tuning system application and the at least one mission radio tuning system application.

Additionally, the processor 106 may be further configured to tune one or more of the at least one civil radio 116 and at least one mission radio 118 for communications, flight plan information, mission flight formation information, controller pilot data link communications, identification of friend or foe, traffic collision avoidance system (TCAS) information, and navigation. Additionally, the processor 106 may be further configured to reassign one or more of the plurality of slots to display information associated with a different application of the at least one civil radio tuning system application 110 and the at least one mission radio tuning system application 112. Additionally, the processor 106 may be further configured to hide the display of the information associated with one or more of the at least one civil radio tuning system application 110 and one or more of the at least one mission radio tuning system application 112.

In some embodiments, the at least one civil radio tuning system application 110 is certified by the Federal Aviation Administration (FAA) and the at least one mission radio tuning system application 112 is uncertified by the FAA. In some embodiments, the at least one mission radio tuning system application 112 would not need to be specifically certified by a regulatory authority, such as the FAA. For example, the at least one mission radio tuning system application 112 may be "uncertified" as the software may be considered to be hosted software (e.g., software hosted by a certified avionics computing device, such as AFD 102). Such hosted software can be modified and updated outside normal configuration management processes for the software included in installed certified equipment (e.g., a certified AFD 102). In some embodiments, regulatory authority certification requirements, such as FAA certification requirements, would be minimized as the software running on the server would comport with the certification requirements.

In some embodiments, hosting "uncertified" software (e.g., at least one mission radio tuning system application 112) in an installed AFD 102 dramatically reduces the cost and speeds up the schedule of rolling out new features into the hosted applications. For example, the at least one mission radio tuning system application 112 can be created and installed on the AFD 102 much faster and much cheaper and allows developers the ability to rapidly deploy software updates to change the displayed radio information on the graphical user interface multifunction window.

The display 104 may be configured to present (e.g., display) any of various content typically presented by an adaptive flight display, as would be appreciated by those of skill in the art. For example, the display 104 may be configured to present, to a user (e.g., a pilot or crewmember), the graphical user interface multifunction window having the particular slots filled with the information associated with the at least one civil radio tuning system application and the at least one mission radio tuning system application. In some embodiments, the display 104 may be implemented as a touchscreen display.

Figure 2:
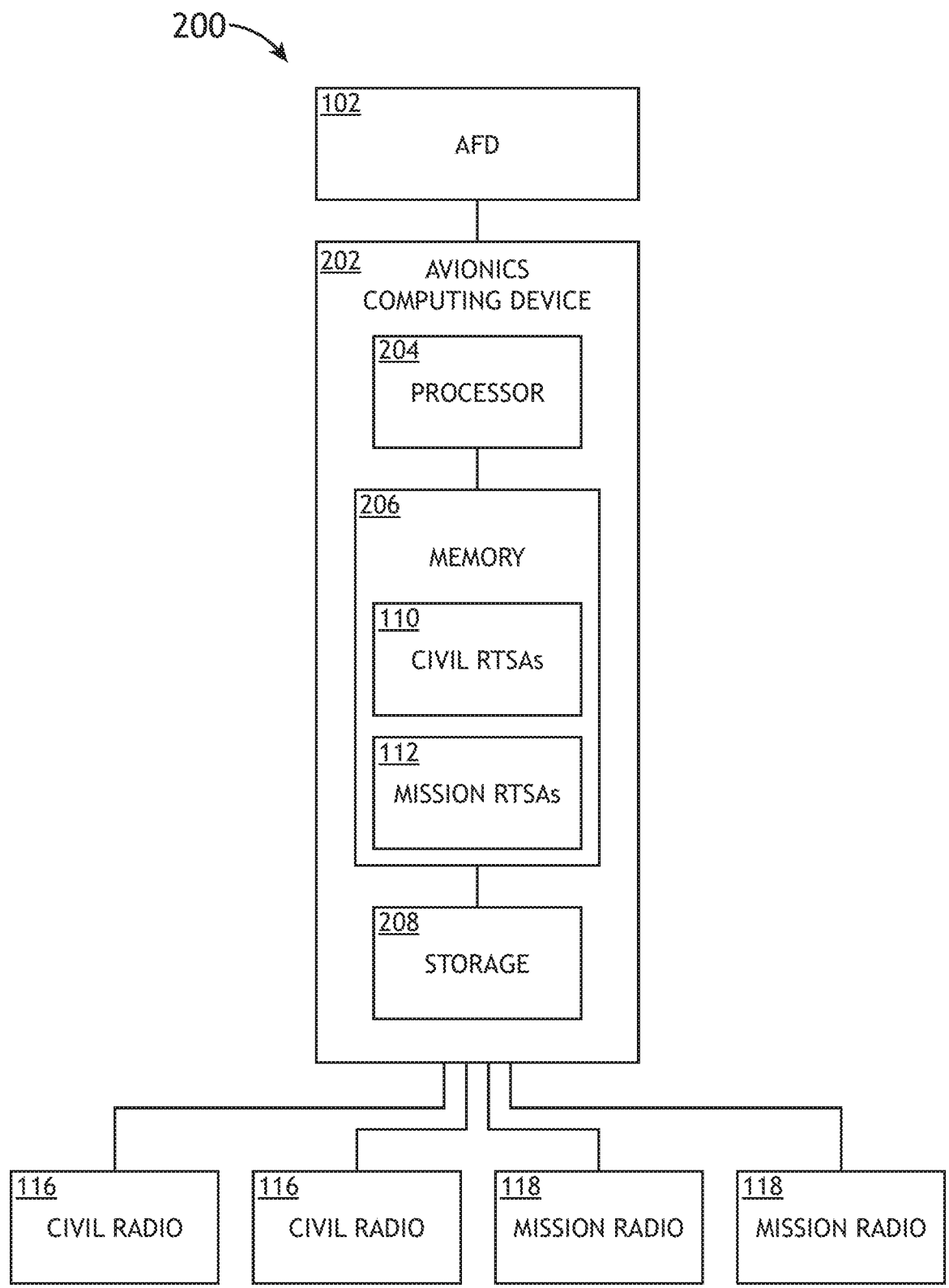
FIG. 2 is a view of an exemplary embodiment of a system implemented in an aircraft according to the inventive concepts disclosed herein.

Referring now to FIG. 2, an exemplary embodiment of a system (e.g., an aircraft system) implemented in an aircraft 200 according to the inventive concepts disclosed herein includes a display (e.g., an adaptive flight display 102), at least one avionics computing device 202 (e.g., a server), at least one civil radio 116, and at least one mission radio 118, some or all of which may be communicatively coupled at any given time. The system of FIG. 2 may be implemented similarly as and function similarly to the system of FIG. 1.

The adaptive flight display 102 may be implemented similarly as and function similarly to the adaptive flight display 102 of FIG. 1, except that the processor 204 of the avionics computing device 202 may perform some or all of the functionality of the processor 106, described above. For example, the adaptive flight display 102 may be configured to present, to a user (e.g., a pilot or crewmember), the graphical user interface multifunction window having the particular slots filled with the information associated with the at least one civil radio tuning system application and the at least one mission radio tuning system application.

The avionics computing device 202 may include at least one processor 204, memory 206, and storage 208, as well as other components, equipment, and/or devices commonly included in an avionics computing device, some or all of which may be communicatively coupled to one another. The processor 204, memory 206, and storage 208 may be implemented similarly as and function similarly to the processor 106, the memory 108, and the storage 114.

Figure 3:
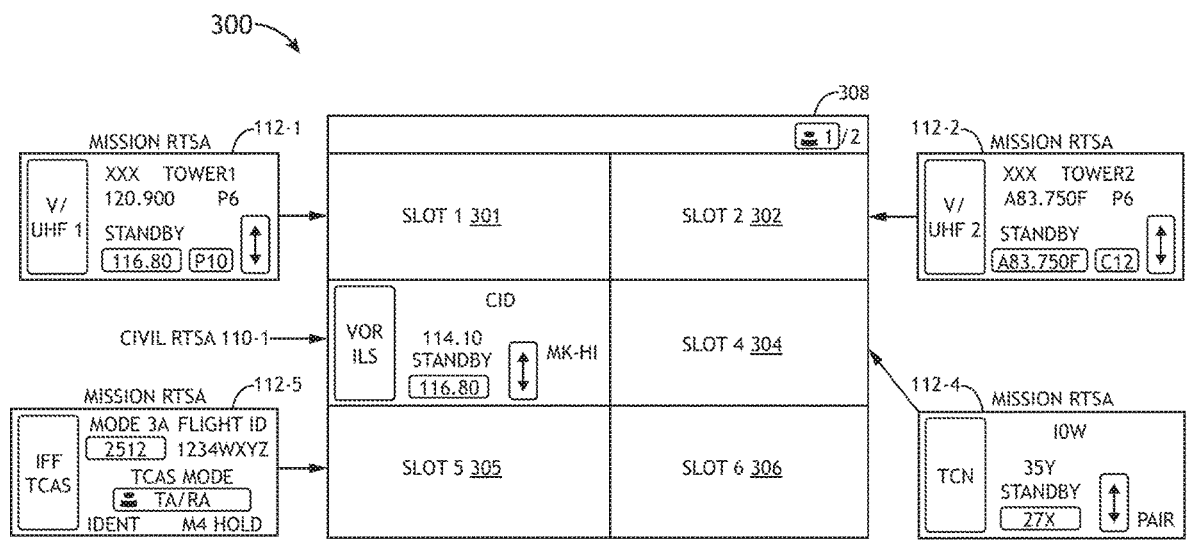
FIG. 3 is an exemplary view of a graphical user interface displayed by an adaptive flight display of FIGS. 1-2 according to the inventive concepts disclosed herein.

Referring now to FIG. 3, an exemplary embodiment of a graphical user interface 300 displayed by an adaptive flight display 102 according to the inventive concepts disclosed is shown. The graphical user interface 300 may include a graphical user interface multifunction window 308 having a plurality of slots. For example, the graphical user interface 300 may include slot 1 301, slot 2 302, slot 3 (shown as filled by civil RTSA 110-1), slot 4 304, slot 5 305, and slot 6 306. For example, the processor 106 may assign slot 1 301 to mission RTSA 112-1, slot 2 302 to mission RTSA 112-2, slot 3 to civil RTSA 110-1, slot 4 304 to mission RTSA 112-4, and slot 5 305 to mission RTSA 112-5, and slot 6 may be unassigned. In some embodiments, the processor 106 may hide the depiction of one or more civil or mission RTSAs from being displayed in a particular slot. The graphical user interface multifunction window 308 may have any suitable number of slots.

Figure 4:
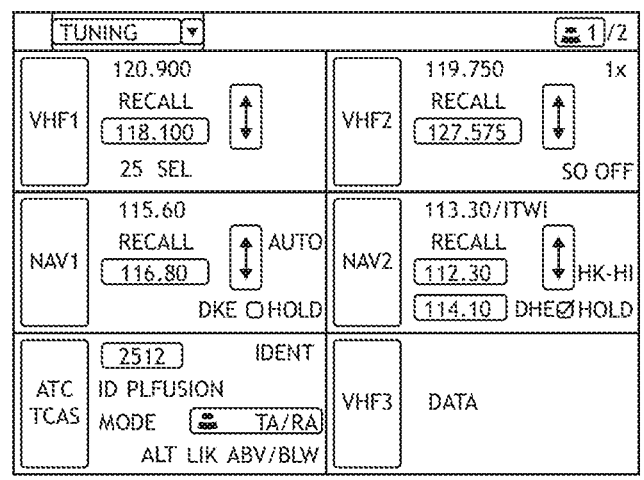
FIG. 4 is an exemplary view of a graphical user interface displayed by an adaptive flight display of FIGS. 1-2 according to the inventive concepts disclosed herein.

Referring now to FIG. 4, an exemplary embodiment of a graphical user interface 400 displayed by an adaptive flight display 102 according to the inventive concepts disclosed is shown. The adaptive flight display 102 may be configured to present, to a user, the graphical user interface multifunction window having particular slots filled with information associated with at least one civil radio tuning system application and at least one mission radio tuning system application.

Figure 5:
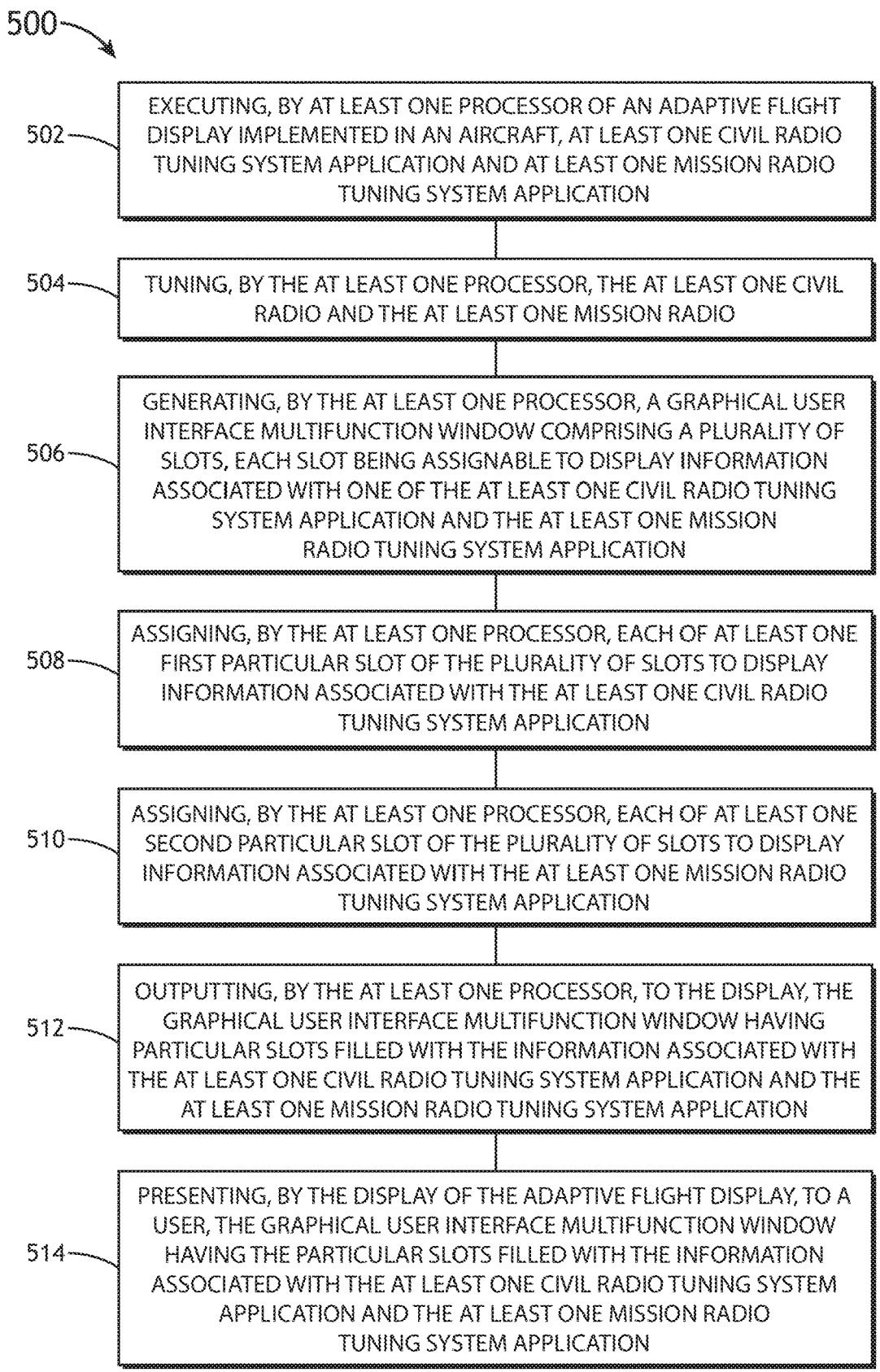
FIG. 5 is a diagram of an exemplary embodiment of a method according to the inventive concepts disclosed herein.

Referring now to FIG. 5, an exemplary embodiment of a method 500 according to the inventive concepts disclosed herein may include one or more of the following steps. Some embodiments may include performing one or more steps of the method 500 iteratively, concurrently, sequentially, and/or non-sequentially. Additionally, for example, some embodiments may include performing one or more instances of the method 500 iteratively, concurrently, and/or sequentially.

A step 502 may include executing, by at least one processor of an adaptive flight display implemented in an aircraft, at least one civil radio tuning system application and at least one mission radio tuning system application, the adaptive flight display comprising a display, the at least one processor, and memory communicatively coupled to the at least one processor, the adaptive flight display communicatively coupled to at least one civil radio and at least one mission radio implemented in the aircraft, the memory configured to maintain the at least one civil radio tuning system application and the at least one mission radio tuning system application, each of the at least one civil radio tuning system application being associated with a particular civil radio of the at least one civil radio, each of the at least one mission radio tuning system application being associated with a particular mission radio of the at least one mission radio.

A step 504 may include tuning, by the at least one processor, the at least one civil radio and the at least one mission radio.

A step 506 may include generating, by the at least one processor, a graphical user interface multifunction window comprising a plurality of slots, each slot being assignable to display information associated with one of the at least one civil radio tuning system application and the at least one mission radio tuning system application.

A step 508 may include assigning, by the at least one processor, each of at least one first particular slot of the plurality of slots to display information associated with the at least one civil radio tuning system application.

A step 510 may include assigning, by the at least one processor, each of at least one second particular slot of the plurality of slots to display information associated with the at least one mission radio tuning system application.

A step 512 may include outputting, by the at least one processor, to the display, the graphical user interface multifunction window having particular slots filled with the information associated with the at least one civil radio tuning system application and the at least one mission radio tuning system application.

A step 514 may include presenting, by the display of the adaptive flight display, to a user, the graphical user interface multifunction window having the particular slots filled with the information associated with the at least one civil radio tuning system application and the at least one mission radio tuning system application.

Further, the method 500 may include any of the operations disclosed throughout.

As will be appreciated from the above, embodiments of the inventive concepts disclosed herein may be directed to a system and a method for managing and displaying civil and mission radio information in a graphical user interface multifunction window on a display implemented in a cockpit of an aircraft.

As used throughout and as would be appreciated by those skilled in the art, "at least one non-transitory computer-readable medium" may refer to as at least one non-transitory computer-readable medium (e.g., memory 108, memory 206, storage 114, storage 208, or a combination thereof; e.g., at least one computer-readable medium implemented as hardware; e.g., at least one non-transitory processor-readable medium, at least one memory (e.g., at least one non-volatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An aircraft system, comprising:
at least one civil radio implemented in an aircraft;
at least one mission radio implemented in the aircraft; and
an adaptive flight display implemented in the aircraft, the adaptive flight display comprising a display, at least one processor, and memory communicatively coupled to the at least one processor, the adaptive flight display communicatively coupled to the at least one civil radio and the at least one mission radio, the memory configured to maintain at least one civil radio tuning system application and at least one mission radio tuning system application, each of the at least one civil radio tuning system application being associated with a particular civil radio of the at least one civil radio, each of the at least one mission radio tuning system application being associated with a particular mission radio of the at least one mission radio, the at least one processor configured to:
execute the at least one civil radio tuning system application and the at least one mission radio tuning system application;
tune the at least one civil radio and the at least one mission radio;
generate a graphical user interface multifunction window comprising a plurality of slots, each slot being assignable to display information associated with one of the at least one civil radio tuning system application and the at least one mission radio tuning system application;
assign each of at least one first particular slot of the plurality of slots to display information associated with the at least one civil radio tuning system application;

assign each of at least one second particular slot of the plurality of slots to display information associated with the at least one mission radio tuning system application; and output, to the display, the graphical user interface multifunction window having particular slots filled with the information associated with the at least one civil radio tuning system application and the at least one mission radio tuning system application;

wherein the display of the adaptive flight display is configured to present, to a user, the graphical user interface multifunction window having the particular slots filled with the information associated with the at least one civil radio tuning system application and the at least one mission radio tuning system application.

2. The system of claim 1, wherein the at least one civil radio tuning system application is certified by the Federal Aviation Administration (FAA) and the at least one mission radio tuning system application is uncertified by the FAA.

3. The system of claim 1, wherein the at least one processor is further configured to tune one or more of the at least one civil radio and the at least one mission radio for communications, flight plan information, traffic collision avoidance system (TCAS) information, and navigation.

4. The system of claim 1, wherein the at least one civil radio is implemented as or includes a communication or navigation radio.

5. The system of claim 1, wherein the at least one mission radio is implemented as or includes a communication or navigation radio.

6. The system of claim 1, wherein each of the at least one civil radio is configured for civilian communications.

7. The system of claim 1, wherein each of the at least one the mission radio is configured for military communications.

8. The system of claim 1, wherein the at least one processor is further configured to reassign one or more of the plurality of slots to display information associated with a different application of the at least one civil radio tuning system application and the at least one mission radio tuning system application.

9. The system of claim 1, wherein the at least one processor is further configured to hide the display of the information associated with one or more of the at least one civil radio tuning system application and one or more of the at least one mission radio tuning system application.

10. An aircraft system, comprising:
at least one civil radio implemented in an aircraft;
at least one mission radio implemented in the aircraft;
a display implemented in the aircraft; and
an avionics computing device implemented in the aircraft, the avionics computing device comprising at least one processor and memory communicatively coupled to the at least one processor, the avionics computing device communicatively coupled to the at least one civil radio, the at least one mission radio, and the display, the memory configured to maintain at least one civil radio tuning system application and at least one mission radio tuning system application, each of the at least one civil radio tuning system application being associated with a particular civil radio of the at least one civil radio, each of the at least one mission radio tuning system application being associated with a particular mission radio of the at least one mission radio, the at least one processor configured to:
execute the at least one civil radio tuning system application and the at least one mission radio tuning system application;

tune the at least one civil radio and the at least one mission radio;

generate a graphical user interface multifunction window comprising a plurality of slots, each slot being assignable to display information associated with one of the at least one civil radio tuning system application and the at least one mission radio tuning system application;

assign each of at least one first particular slot of the plurality of slots to display information associated with the at least one civil radio tuning system application;

assign each of at least one second particular slot of the plurality of slots to display information associated with the at least one mission radio tuning system application; and output, to the display, the graphical user interface multifunction window having particular slots filled with the information associated with the at least one civil radio tuning system application and the at least one mission radio tuning system application;

wherein the display is configured to present, to a user, the graphical user interface multifunction window having the particular slots filled with the information associated with the at least one civil radio tuning system application and the at least one mission radio tuning system application.

11. The system of claim 10, wherein the at least one civil radio tuning system application is certified by the Federal Aviation Administration (FAA) and the at least one mission radio tuning system application is uncertified by the FAA.

12. The system of claim 10, wherein the at least one processor is further configured to tune one or more of the at least one civil radio and the at least one mission radio for communications, flight plan information, traffic collision avoidance system (TCAS) information, and navigation.

13. The system of claim 10, wherein the at least one civil radio is implemented as or includes a communication or a navigation radio.

14. The system of claim 10, wherein the at least one mission radio is implemented as or includes a communication or navigation radio.

15. The system of claim 10, wherein the civil radio is configured for civilian communications.

16. The system of claim 10, wherein the mission radio is configured for military communications.

17. The system of claim 10, wherein the at least one processor is further configured to reassign one or more of the plurality of slots to display information associated with a different application of the at least one civil radio tuning system application and the at least one mission radio tuning system application.

18. The system of claim 10, wherein the at least one processor is further configured to hide the display of the information associated with one or more of the at least one civil radio tuning system application and one or more of the at least one mission radio tuning system application.

19. A method of operating an aircraft system, comprising:
executing, by at least one processor of an adaptive flight display implemented in an aircraft, at least one civil radio tuning system application and at least one mission radio tuning system application, the adaptive flight display comprising a display, the at least one processor, and memory communicatively coupled to the at least one processor, the adaptive flight display communicatively coupled to at least one civil radio and at least one mission radio implemented in the aircraft, the memory configured to maintain the at least one civil radio tuning system application and the at least one mission radio tuning system application, each of the at least one civil radio tuning system application being associated with a particular civil radio of the at least one civil radio, each of the at least one mission radio tuning system application being associated with a particular mission radio of the at least one mission radio;

tuning, by the at least one processor, the at least one civil radio and the at least one mission radio;

generating, by the at least one processor, a graphical user interface multifunction window comprising a plurality of slots, each slot being assignable to display information associated with one of the at least one civil radio tuning system application and the at least one mission radio tuning system application;

assigning, by the at least one processor, each of at least one first particular slot of the plurality of slots to display information associated with the at least one civil radio tuning system application;

assigning, by the at least one processor, each of at least one second particular slot of the plurality of slots to display information associated with the at least one mission radio tuning system application;

outputting, by the at least one processor, to the display, the graphical user interface multifunction window having particular slots filled with the information associated with the at least one civil radio tuning system application and the at least one mission radio tuning system application; and presenting, by the display of the adaptive flight display, to a user, the graphical user interface multifunction window having the particular slots filled with the information associated with the at least one civil radio tuning system application and the at least one mission radio tuning system application.

20. The method of claim 19, wherein the at least one civil radio tuning system application is certified by the Federal Aviation Administration (FAA) and the at least one mission radio tuning system application is uncertified by the FAA.

\* \* \* \* \*